(12) United States Patent
Minganti

(10) Patent No.: US 9,004,134 B2
(45) Date of Patent: Apr. 14, 2015

(54) METHOD AND PLANT FOR APPLYING A HEAT-SHRINKABLE LABLE TO CONTAINERS

(75) Inventor: Gianni Minganti, Imola (IT)

(73) Assignee: Sacmi Imola S.C., Imola (Bologna) (IT)

( * ) Notice: Subject to any disclaimer, the term of this patent is extended or adjusted under 35 U.S.C. 154(b) by 744 days.

(21) Appl. No.: 13/252,394

(22) Filed: Oct. 4, 2011

(65) Prior Publication Data

US 2012/0085497 A1  Apr. 12, 2012

Related U.S. Application Data

(62) Division of application No. 10/537,904, filed as application No. PCT/IT03/00034 on Jan. 29, 2003, now abandoned.

(51) Int. Cl.
| | |
|---|---|
| B65C 3/00 | (2006.01) |
| B65C 3/08 | (2006.01) |
| B65C 3/14 | (2006.01) |
| B65C 3/06 | (2006.01) |
| B29C 51/16 | (2006.01) |

(52) U.S. Cl.
CPC ............... B65C 3/065 (2013.01); *B29C 51/165* (2013.01)

(58) Field of Classification Search
CPC .............. B65C 3/065; B65C 3/08; B65C 3/14
USPC ................... 156/446, 447, 98, 476, 475, 539, 156/DIG. 8, DIG. 9, DIG. 12, DIG. 27, 156/DIG. 28, DIG. 36, DIG. 51; 53/442, 399, 53/441, 556, 557

See application file for complete search history.

(56) References Cited

U.S. PATENT DOCUMENTS

| | | | |
|---|---|---|---|
| 3,523,052 A | | 8/1970 | Bolen |
| 3,767,496 A | * | 10/1973 | Amberg et al. ................. 156/86 |
| 3,959,065 A | | 5/1976 | Ashcroft |
| 4,208,237 A | | 6/1980 | Heyne |
| 4,514,966 A | | 5/1985 | Konstantin |
| 4,991,377 A | * | 2/1991 | Marchesini ..................... 53/478 |
| 5,483,783 A | | 1/1996 | Lerner et al. |

FOREIGN PATENT DOCUMENTS

| | | |
|---|---|---|
| DE | 19859063 | 6/2000 |
| DE | 10023658 | 10/2001 |
| JP | 60219030 | 11/1985 |

* cited by examiner

*Primary Examiner* — Christopher Schatz
(74) *Attorney, Agent, or Firm* — Browdy and Neimark, PLLC

(57) ABSTRACT

A container labelling method consisting of predisposing means for supporting at least one container in an erect position; from below, mounting onto the body of said at least one container a heat-shrinkable label in the form of an annular band; and causing the label to adhere to said container. The method is implemented by a plant comprising a device for supporting and transporting at least one container which acts from above on the container suspended in an erect position; means for mounting a heat-shrinkable annular band onto the container from below; and means for causing said label to adhere to said container by heat-shrinkage.

9 Claims, 9 Drawing Sheets

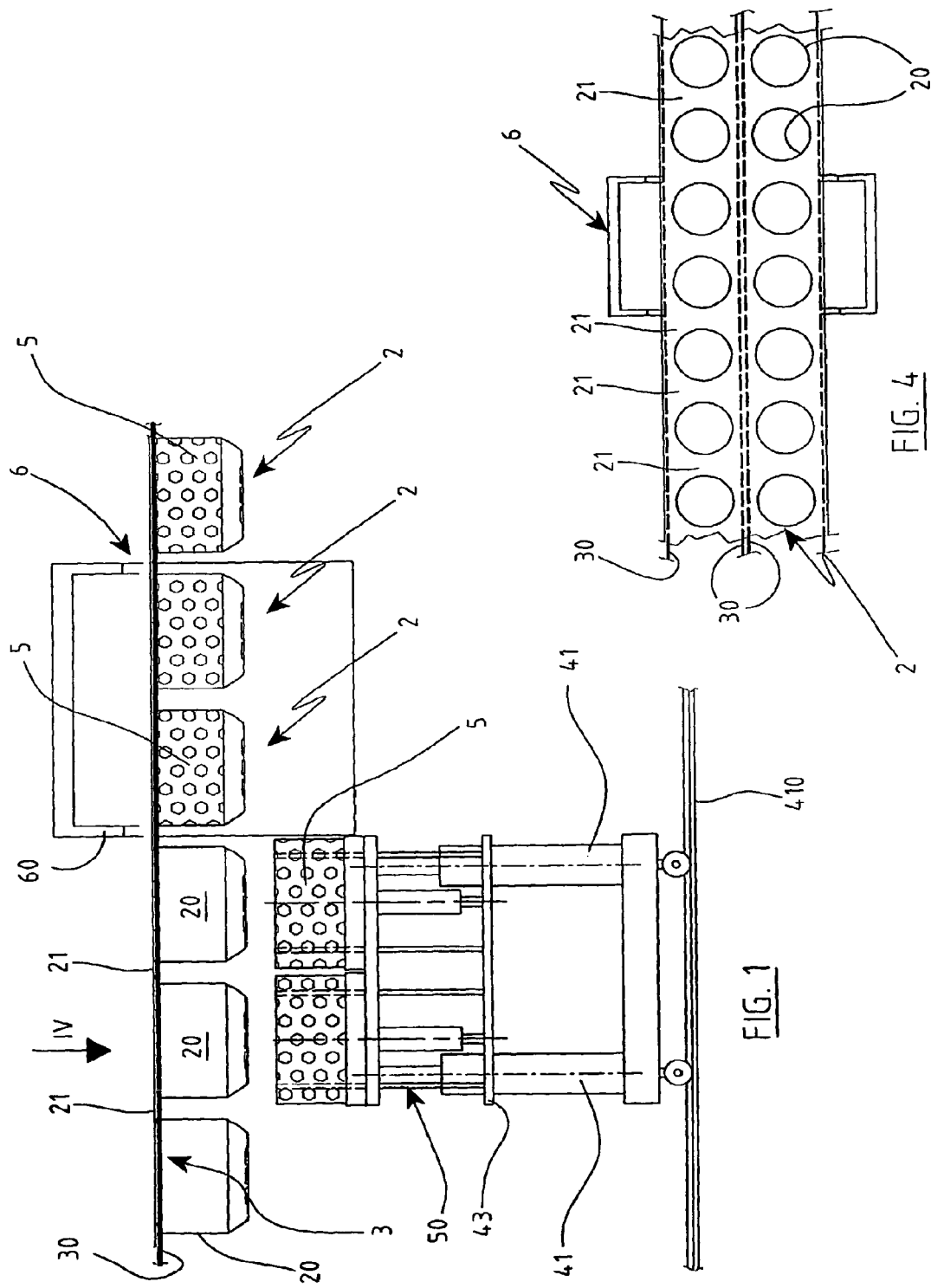

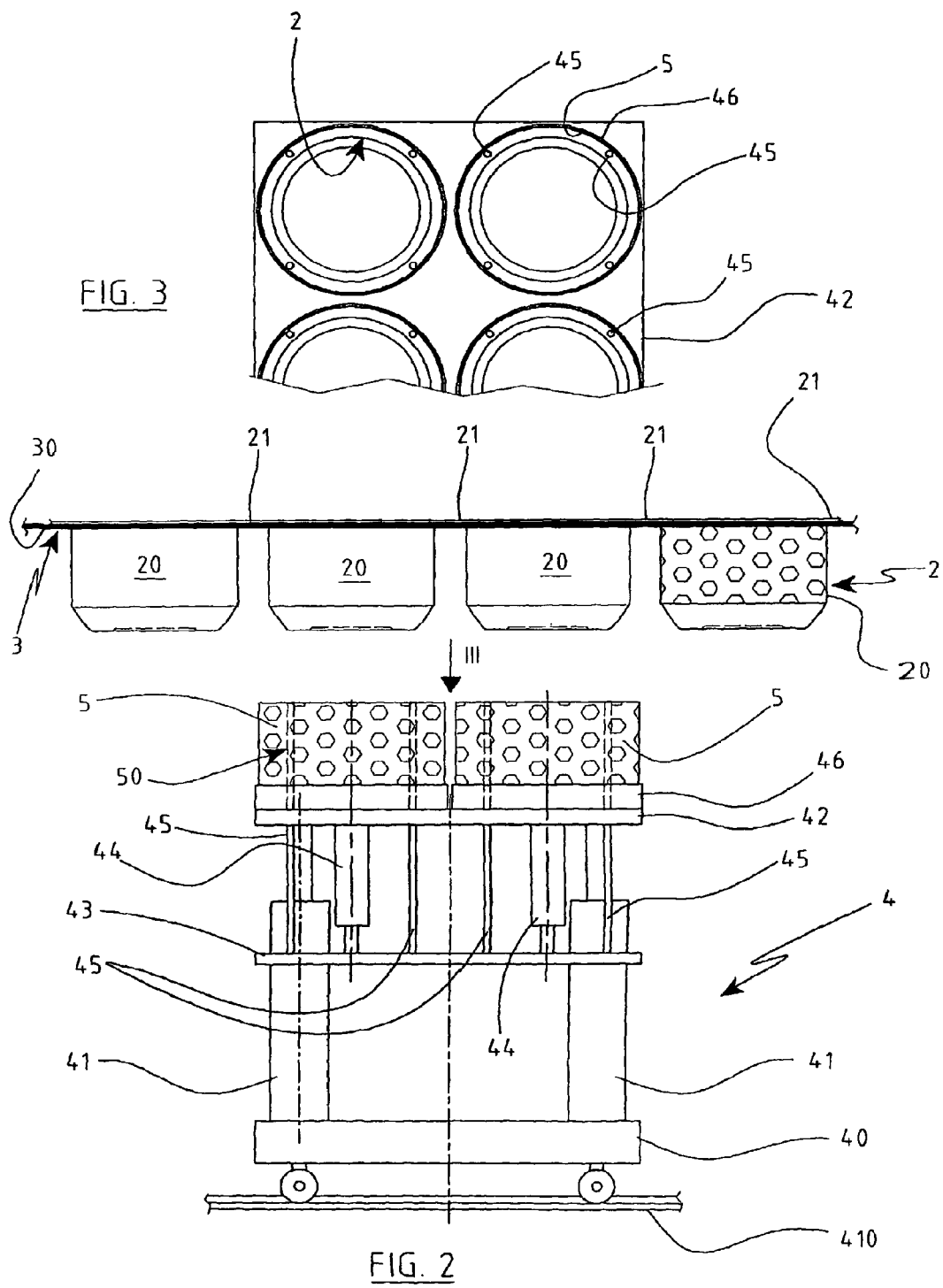

METHOD AND PLANT FOR APPLYING A HEAT-SHRINKABLE LABLE TO CONTAINERS

CROSS-REFERENCE TO RELATED APPLICATIONS

The present application is a division of U.S. application Ser. No. 10/537,904, filed on Jun. 14, 2006, which is a national stage entry of PCT/IT2003/000034, filed on Jan. 29, 2003.

TECHNICAL FIELD

This invention relates in general to a method for labelling containers by means of a heat-shrinkable label, and a plant for implementing said method.

The method of the invention can be applied generally to any container, to and in particular to those containers in the form of a containing tub, with the upper mouth of which there is associated an outer rim or collar projecting beyond the outer surface of the tub.

BACKGROUND ART

In the known art, containers are labelled by suitable labelling machines positioned in series with the machines which form and fill the containers.

Specifically, in the known art a plurality of containers are formed simultaneously such that their outer rims are joined together. When the containers have been formed with their mouths facing upwards, they are filled with the product which they are to receive, after which the container mouth is sealed by a suitable lid. The filled and sealed containers pass through a separation station where blade-type cutting devices are present which incise and/or cut the rims joining the containers together in order to separate them.

Each container is then inverted and fed to a labelling machine, which mounts from above onto the body of the container a heat-shrinkable label in the form of an annular band, so that it rests on the container outer rim.

The container provided with the label is then fed through a heating tunnel where the label is made to adhere to the container body by heat. On termination of this operation the container must be again inverted, and then fed to packaging means of usual type.

The aforesaid method is complicated to carry out as each container must be inverted to enable the band-shaped label to be mounted on it from above. This complication is accentuated if the containers contain different products or the same product but of a different flavour. In such a case to suitable means must be provided for handling the containers so that the correct label for the product concerned is applied.

An object of this invention is to overcome the drawbacks of the known art within the framework of a simple, reliable and rational solution, able to reduce the final cost.

DISCLOSURE OF THE INVENTION

The invention attains this and other objects by virtue of the characteristics defined in the claims.

In particular, the invention provides a container labelling method comprising the following operative steps:
a. predisposing a support device for at least one container having a mouth with which an outer rim is associated,
b. from below, mounting onto the body of said at least one container a heat-shrinkable label in the form of an annular band,
c. causing the label to adhere to said container.

According to the invention the label is made to adhere to the container body by a hot fluid which by heating the label causes it to heat-shrink.

Said hot fluid is preferably a jet of steam or hot air.

The method of the invention is implemented by a plant comprising a device for supporting and transporting at least one container, means for mounting a heat-shrinkable label onto said at least one container from below, and means for causing said label to adhere to said container by heat-shrinkable.

Said support device generally grips the container in proximity to its mouth, but can also support the container from below depending on the type of container to be labelled.

In a first embodiment of the invention the support device comprises two parallel steel cables which support the container rim by acting on the lower surface of the rim. The container is made to translate by a gripper which grips the container rim.

In a different embodiment the support device comprises grippers for gripping the container rim. In other embodiments of the invention the container is gripped from the interior of its mouth.

According to a first embodiment of the invention said means for causing the label to adhere to the container comprise a shrinkage tunnel provided with heating devices arranged to release a hot fluid which acts on the outer surface of the label. The hot fluid heats the label which by heat-shrinkage then shrinks to adhere to the container.

According to a second and preferred embodiment of the invention, said means for causing the label to adhere to the container are associated with means for mounting the label onto the container from below.

From the aforegoing it is apparent that by virtue of the invention, labels can be applied to containers while still joined together, so enabling multi-packs to be made up. Moreover the method of the invention is suitable for direct application along the container forming and filling line, leading to an overall size reduction and prevention of interface problems. In this respect, the label can be mounted at any point of the machine after the containers have been formed.

For a better understanding of the operation of the method of the invention and the characteristics and constructional merits of the relative means of implementation, reference is made hereinafter to the figures of the accompanying drawings which illustrate, by way of non-limiting example, two preferred embodiments of the plant for implementing the aforesaid method.

FIG. 1 is a schematic view of a first embodiment of the invention.

FIG. 2 is an enlarged partial view of FIG. 1.

FIG. 3 is an enlarged partial view in the direction III of FIG. 2.

FIG. 4 is an enlarged partial view in the direction IV of FIG. 1.

Figure 5:
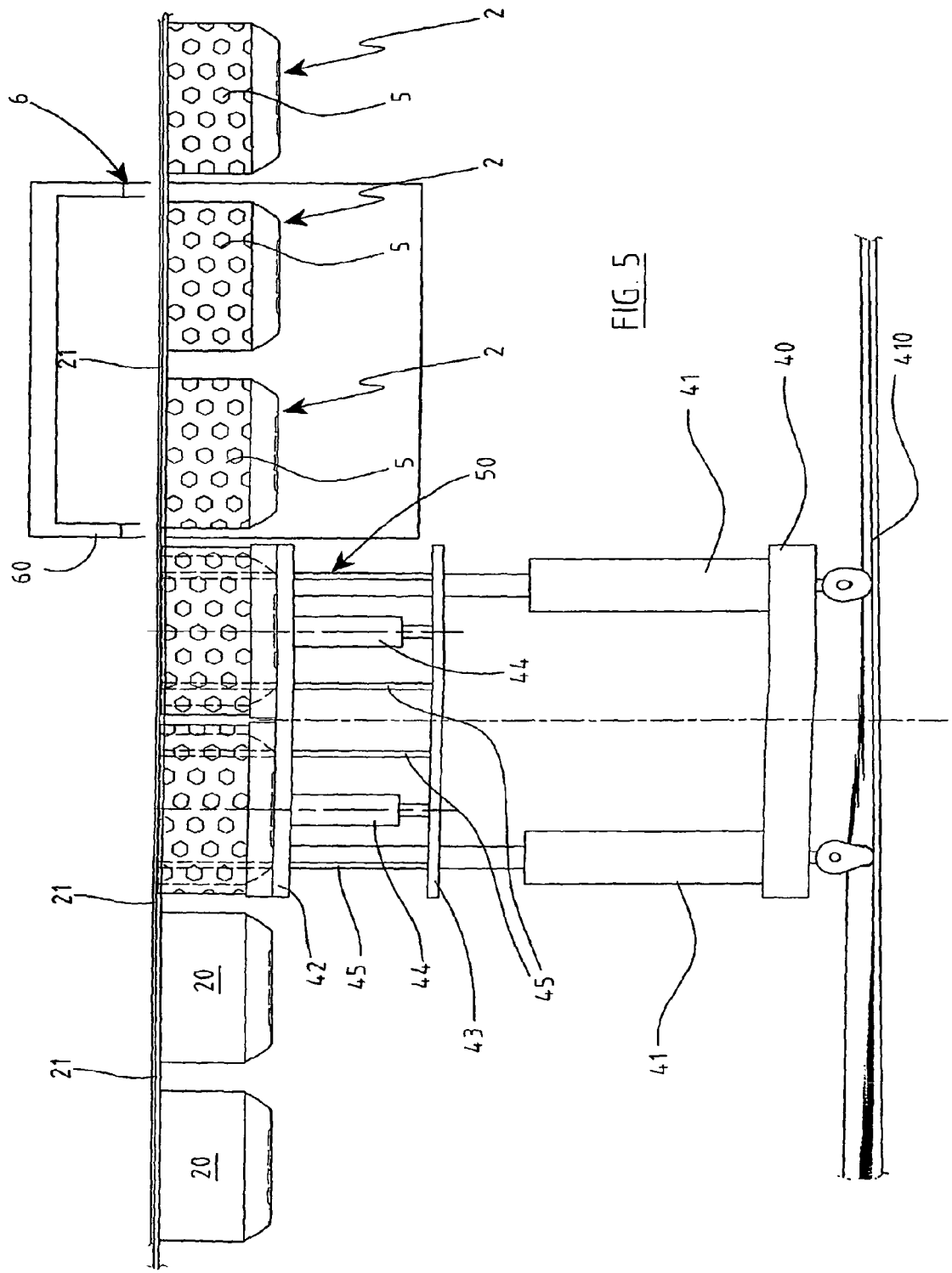
FIGS. 5, 6, 7 and 8 show the operative steps of the first embodiment of the invention.

Said figures show the plant 1, which comprises two parallel rows of containers 2 obtained by thermoforming. Each container 2 comprises a cup-shaped body 20 with an outer upper rim 21 which projects beyond said body 20, and by means of which each container is joined to the adjacent container. The containers 2 of each row are supported by a support and transport device 3 comprising two spaced-apart parallel steel cables 30 (FIG. 2) on which the rim 21 of each container rests.

The containers are advanced along the cables 30 by a usual gripper, not shown, which grips the rim 21 of the containers and causes then to advance along said cables 30.

Below the containers 2 there are positioned means 4 for applying an annular band-shaped label 5 to the body 20 of the containers 2. In this embodiment said means 4 are able to mount a label onto four containers 2 simultaneously. In detail, the means 4 comprise a carriage 40 arranged to translate on guides 410 by virtue of a linkage, not shown.

On the carriage 40 there are provided four vertical hydraulic cylinder-piston units 41, two of which are visible in FIG. 1, for supporting a first horizontal plate 42 and causing it to translate vertically.

With the plate 42 there are associated four identical label support units 50, each comprising four rods 45 branching from a movable second plate 43 supported by the plate 42 by virtue of the cylinder-piston units 44.

Said rods 45 are inserted through four matching holes present in the plate 42 and pass beyond the plate to externally receive the annular labels 5.

In practice, the function of the rods 45 is to maintain the labels 5 widened while they are mounted onto the body 20 of the container 2.

With reference to FIG. 3, the rods 45 of each support unit are disposed on the perimeter of an imaginary circumference, the centre of which passes through the vertical axis of each container and are spaced equally apart. Moreover as the label 5 has to adhere to only an axial portion of the container body. each label rests on an annular spacer 46 extending from the plate 42.

Downstream of the carriage 40, means 6 are provided to cause the labels to adhere to the bodies of the containers 2. Said means 6 comprise a tunnel 60 of usual type provided with devices, not shown as they are of known type, for heating the label by means of a hot fluid, such as a jet of steam or hot air. By the effect of the hot fluid the labels 5 are heated and shrink to adhere to the body 20 of the container 2.

The operation of the invention is described hereinafter with reference to FIGS. 1, 5, 6, 7 and 8.

The labels 5 are firstly positioned on the carriage 40 by means not shown.

The carriage 40 is then moved below the containers 2 so that each label 5 lies below the respective container 2 on which it is to be mounted. At this point, by operating the cylinder-piston units 41 the plate 42 is made to rise to mount the label on the body of the overlying container 2, as shown in FIG. 5.

Figure 6:
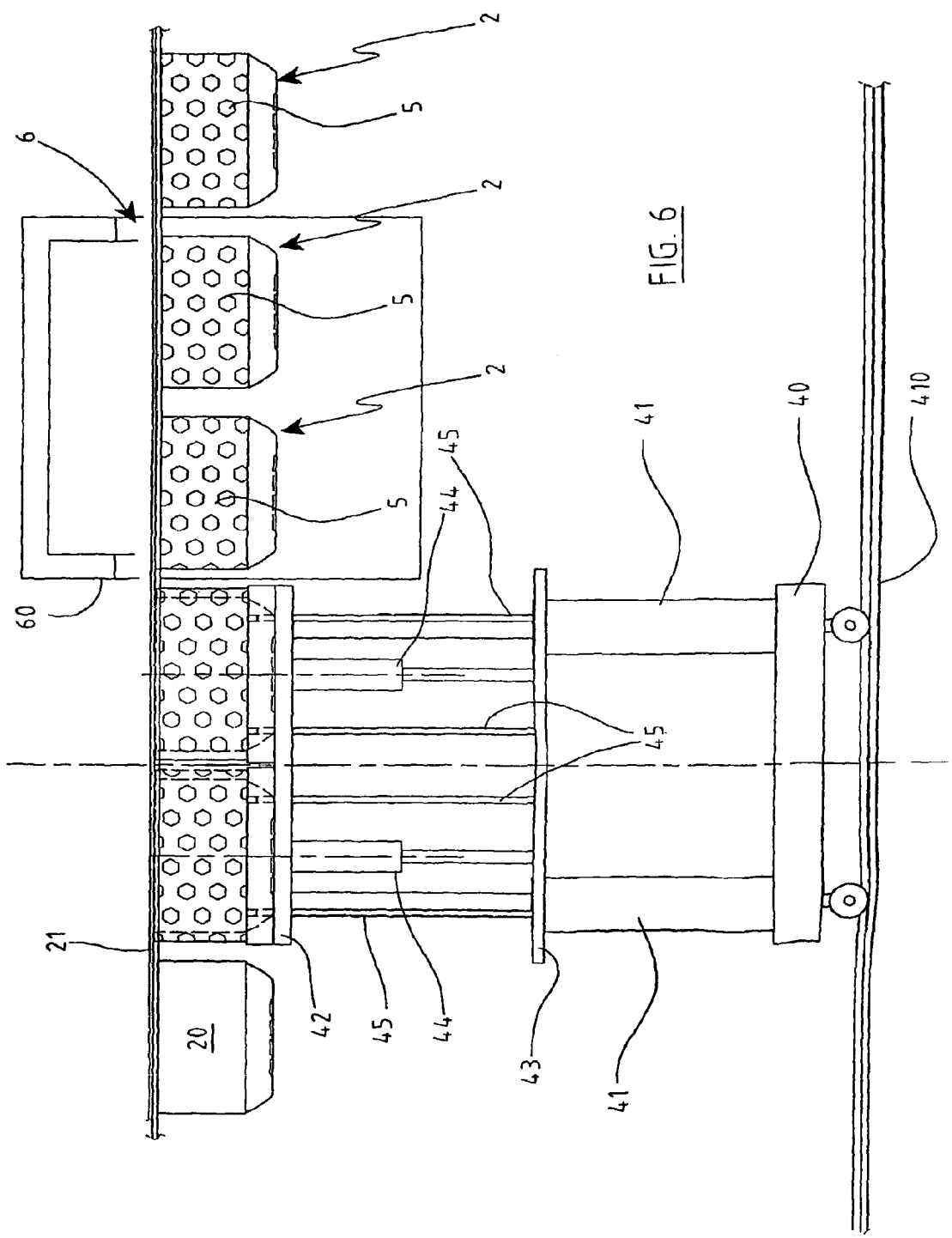
Figure 7:
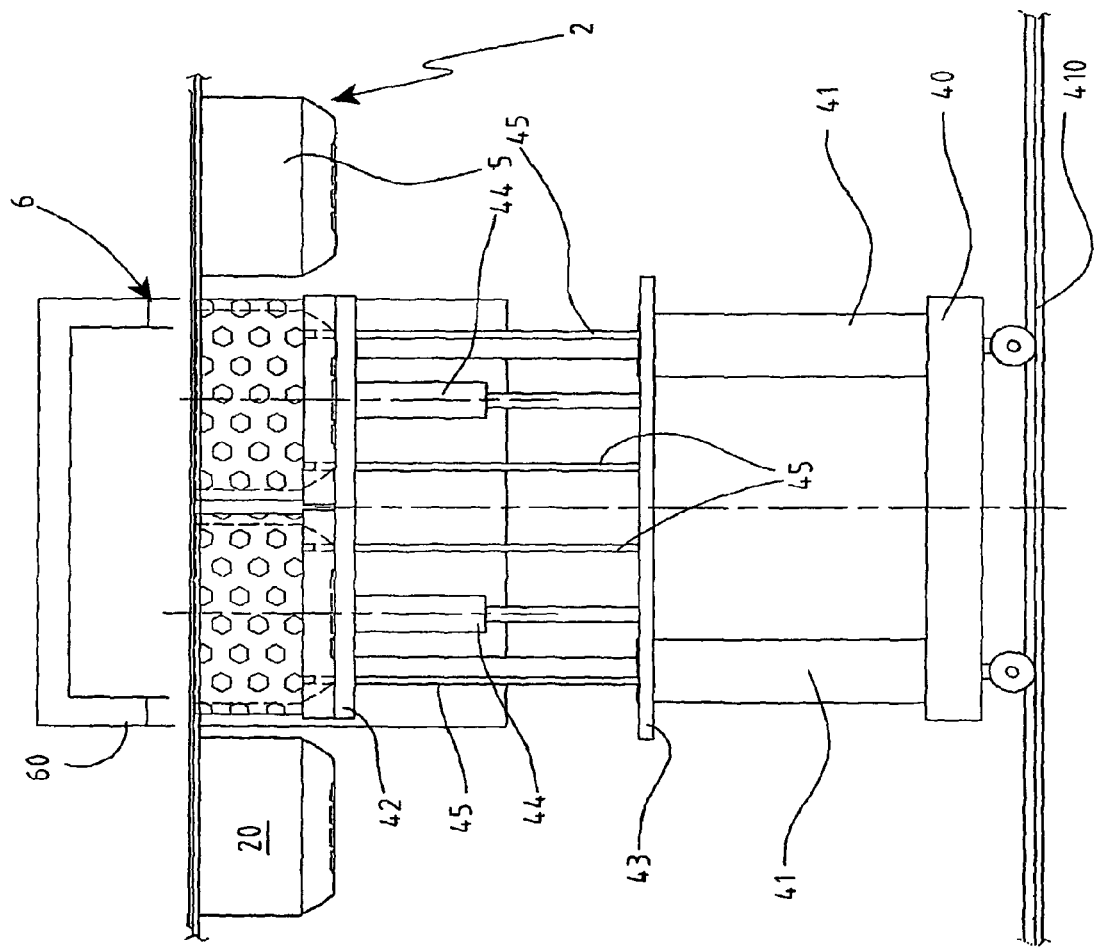
Figure 8:
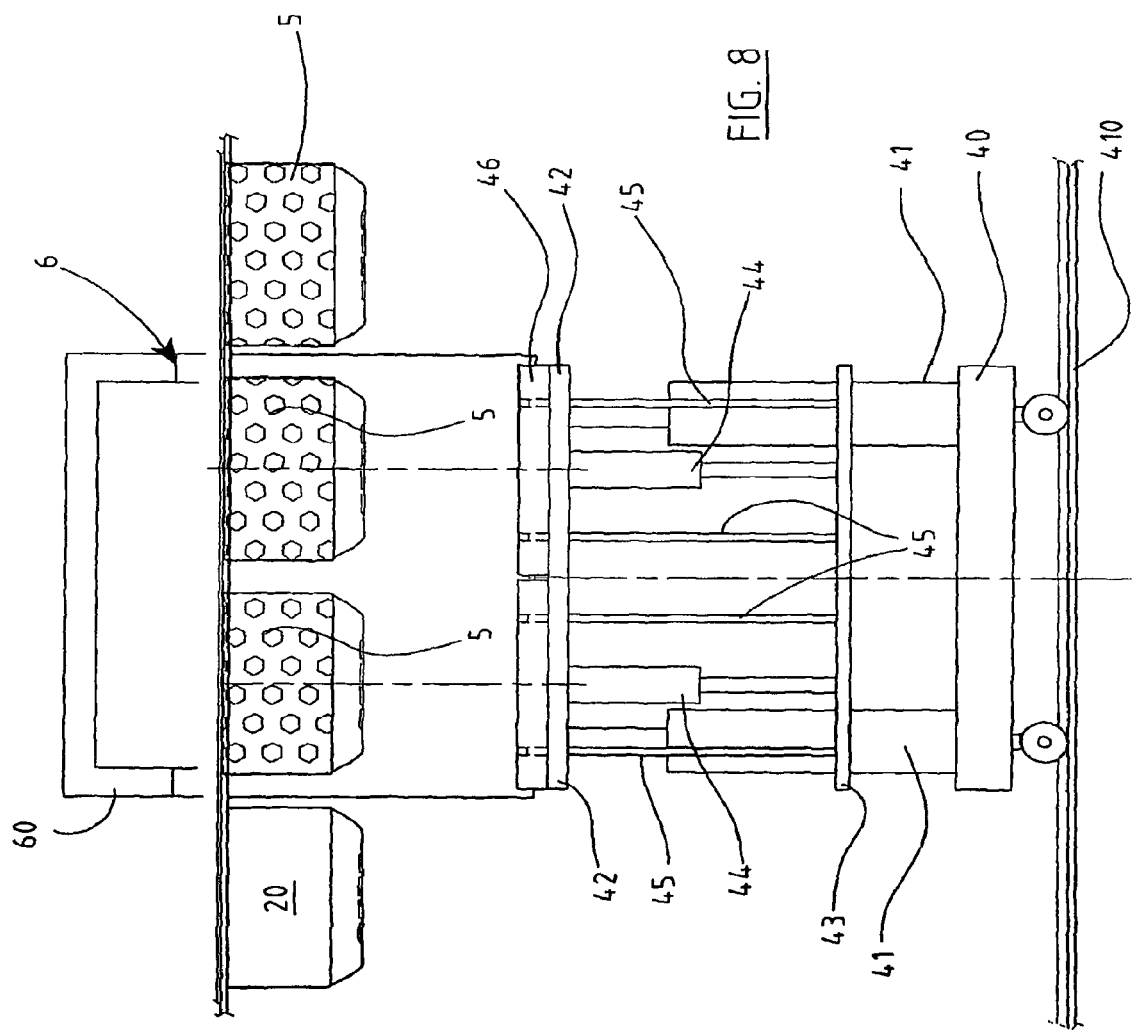
Figure 9:
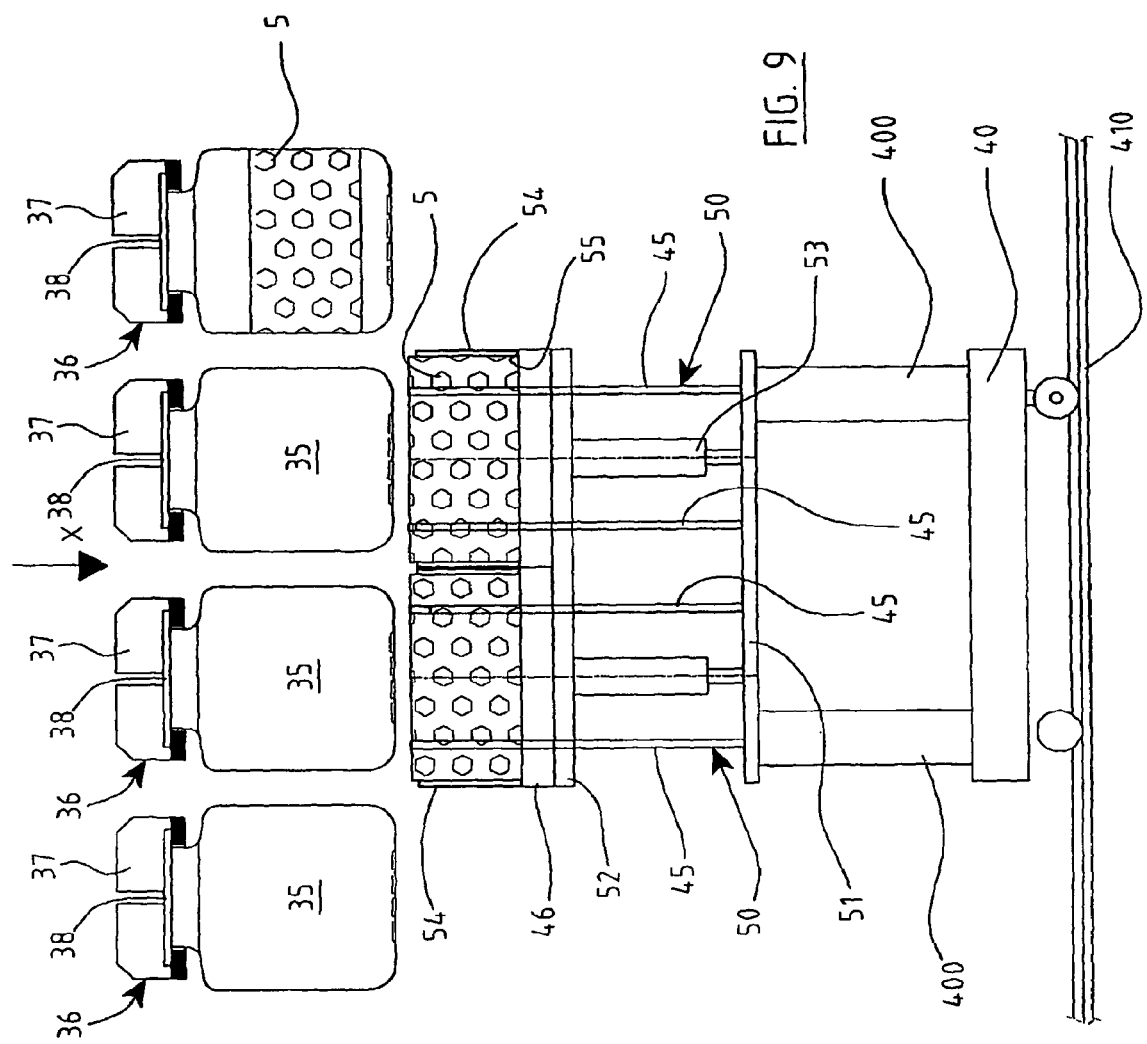
FIG. 9 shows a second embodiment of the invention.
Figure 10:
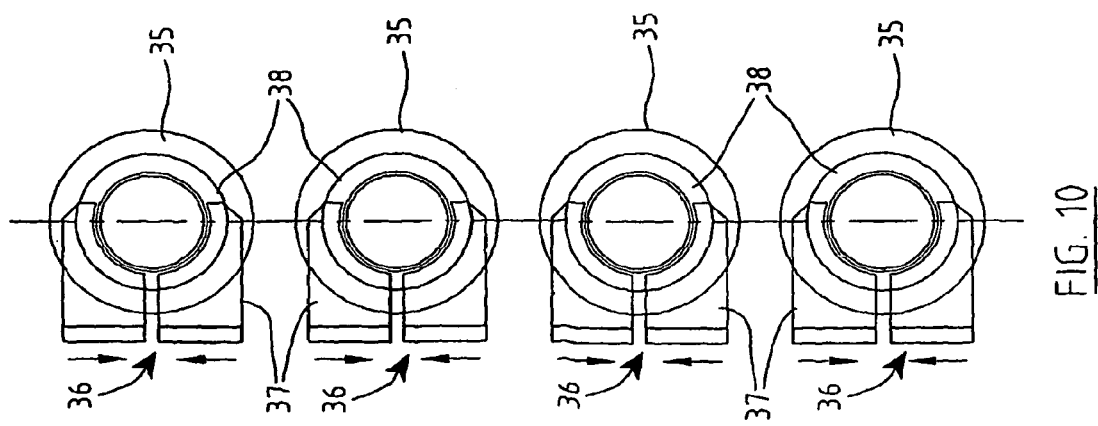
FIG. 10 is a partial view in the direction X of FIG. 9.
Figure 11:
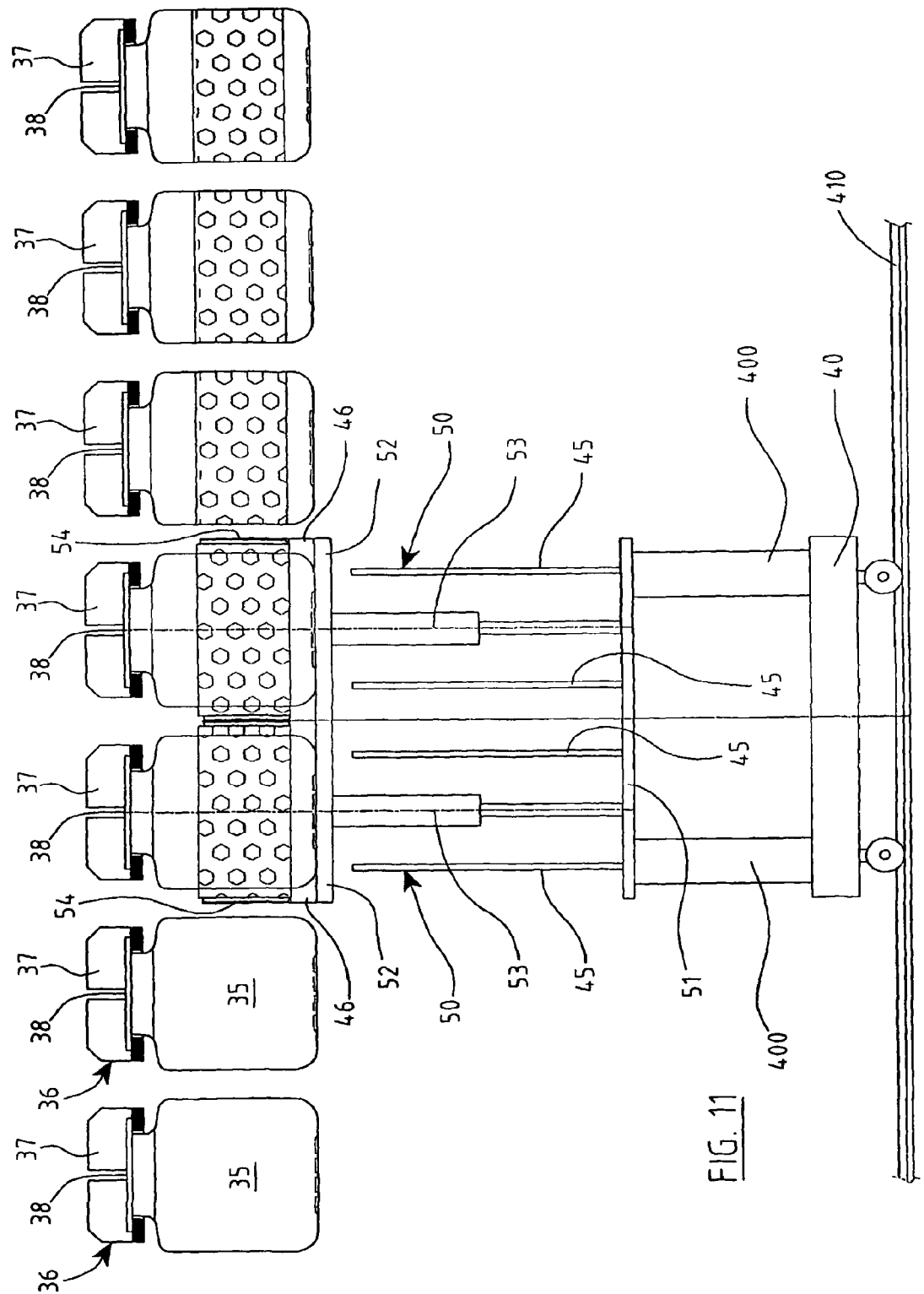
FIGS. 11 and 12 show two operative steps of the second embodiment of the invention.

When the labels 5 have been mounted on the containers 2, the cylinder-piston units 41 are operated to lower the plate 43 carrying the rods 45, so that the rods lying between the labels and the container bodies are themselves lowered (FIG. 6).

At this point the carriage 40 is made to translate to bring the containers 2 into the interior of the heat-shrinkage tunnel 60, where suitable heating devices heat the labels 5 which, by the effect of the heat, shrink to adhere to the body 20 of the containers 2.

On termination of the shrinkage process the plate 42 is lowered and the carriage 40 repositioned outside the shrinkage tunnel, into its initial position shown in FIG. 1. At this point the cycle is repeated in an identical manner.

FIGS. 9 to 13 show a second embodiment of the invention for labelling containers 35. As can be seen from the figures the individual containers 35 are supported by a support device 36 comprising grippers 37 arranged to grip them in correspondence with an upper collar 38.

In the description of the second embodiment of the invention the same to reference numerals are used to indicate components identical to those already described.

With reference to FIG. 4, this shows that the carriage 40 supports, by means of four identical columns 400, a fixed plate 51 on which four support units 50 for the labels 5 are present.

Each unit 50 comprises four fixed rods 45 on which there is mounted a movable plate 52 which can translate vertically relative to said rods 45 by virtue of two cylinder-piston units 53 which connect it to the fixed plate 51.

The movable plate 52 carries both said label support means and the means for causing each label 5 to adhere to the body of the respective container 35. Specifically, the support means for the labels comprise the annular spacers 46, and the means for causing the labels to adhere comprise for each unit 50 a cylinder 54 mounted about each group of four rods 45 and a series of dispenser nozzles 55 (FIG. 13).

The dispenser nozzles 55 are supported by the movable plate 52, which comprises a circuit, not shown, for connecting the dispenser nozzles 55 to a usual system, not shown, for delivering a hot fluid, such as hot air or steam.

Figures 12, 13:
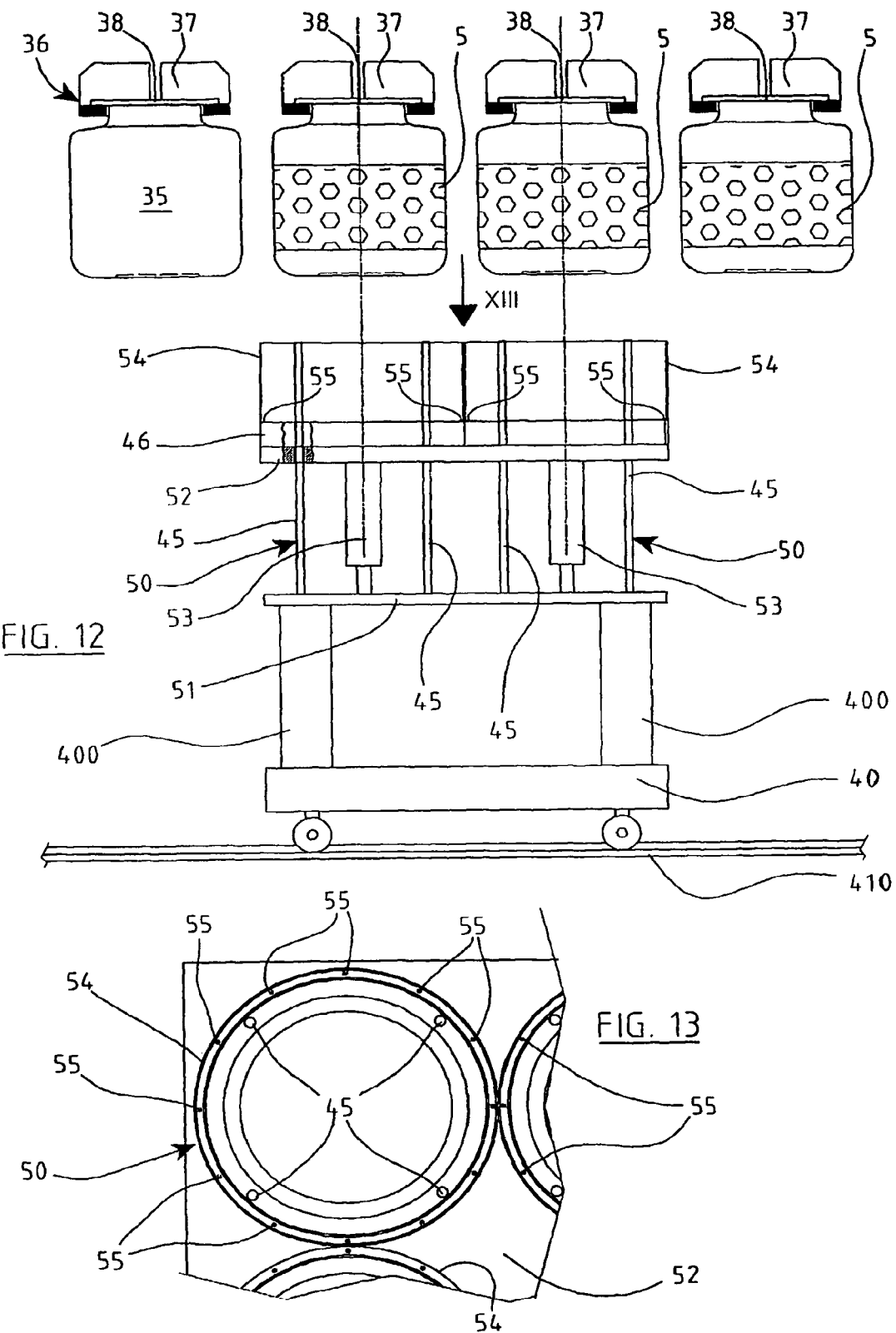
FIG. 13 is a partial view in the direction XIII of FIG. 12.

With reference to FIG. 13, the dispenser nozzles 55 are equidistant and disposed on an imaginary circumference, the centre of which lies on the label axis, and are external to the circumference on which the rods 45 are positioned. In this case the operation of the invention is very simple, and is illustrated in FIGS. 9 to 13. With reference to the figures the labels 5 are firstly positioned on the units 50, then the carriage 40 is positioned below the containers 35, so that each container 35 lies exactly above the unit 50 carrying the label 5.

When the carriage 40 is in position the cylinder-piston units are operated to raise the movable plate 52 so as to mount the labels 5 on the containers 35 by withdrawing them from the rods 45. At this point the pressurized fluid delivery system is operated to heat the labels, which by heat-shrinkage adhere to the containers 35.

What is claimed is:

1. A labelling plant for containers having a rim or collar, comprising:
    a support device for directly supporting at least two containers held by means that attach to the collar on each of said containers, and for transporting at least one of the containers which is suspended in an erect position;
    means for slidably moving said at least two containers along said support device;
    means for mounting at the same time a heat-shrinkable annular band onto each of said at least two containers acting from below the containers;
    means for causing said annular bands to adhere to said containers by heat-shrinkage;
    wherein said means for mounting a heat-shrinkable annular band onto each of said containers comprise at least one vertically movable support plate to transport the annular bands which are disposed vertically; and
    the means for causing each of the annular bands to adhere by heat shrinkage is supported on said support plate.

2. A plant as claimed in claim 1, wherein said means for causing the heat-shrinkable annular band bands to adhere by heat-shrinkage comprises a system for delivering a hot fluid.

3. A plant as claimed in claim 2, wherein said hot fluid is steam.

4. A plant as claimed in claim 1, wherein said means for causing the heat-shrinkable annular band bands to adhere to the container/containers comprise a plurality of hot fluid dispensing nozzles supported on the vertically movable support plate.

5. A plant as claimed in claim 1, wherein said vertically movable support plate comprises a unit for maintaining the heat-shrinkable annular band vertical.

6. A plant as claimed in claim 5, wherein said unit for maintaining the heat-shrinkable annular band vertical comprises vertical rods branching from a fixed plate connected to the vertically movable support plate by virtue of at least one cylinder-piston unit.

7. A plant as claimed in claim 6, wherein said vertical rods are disposed on the perimeter of an imaginary circumference to maintain the heat-shrinkable annular band widened while it is mounted onto the container.

8. A plant as claimed in claim 6 wherein said vertical rods are inserted through corresponding matching holes present in the vertically movable support plate and pass beyond said plate to externally receive the heat-shrinkable annular band.

9. A plant as claimed in claim 1, wherein said at least one vertically movable support plate is configured to vertically transport said heat-shrinkable annular band onto said at least one container.

* * * * *